(12) United States Patent
Ryniker

(10) Patent No.: US 12,510,814 B1
(45) Date of Patent: Dec. 30, 2025

(54) PROJECTION SYSTEM AND METHODS THEREFOR

(71) Applicant: The Invisible Pixel Inc., San Diego, CA (US)

(72) Inventor: Kevin Walter Ryniker, San Diego, CA (US)

(73) Assignee: The Invisible Pixel Inc., San Diego, CA (US)

( * ) Notice: Subject to any disclaimer, the term of this patent is extended or adjusted under 35 U.S.C. 154(b) by 466 days.

(21) Appl. No.: 18/084,738

(22) Filed: Dec. 20, 2022

Related U.S. Application Data

(60) Provisional application No. 63/293,418, filed on Dec. 23, 2021.

(51) Int. Cl.
  *G03B 21/20* (2006.01)
  *G03B 21/00* (2006.01)
  *H04N 9/31* (2006.01)

(52) U.S. Cl.
  CPC ......... *G03B 21/204* (2013.01); *G03B 21/006* (2013.01); *G03B 21/2013* (2013.01); *H04N 9/3135* (2013.01); *H04N 9/3141* (2013.01)

(58) Field of Classification Search
  CPC ............... G03B 21/204; G03B 21/006; G03B 21/2013; H04N 9/3135; H04N 9/3141
  See application file for complete search history.

(56) References Cited

U.S. PATENT DOCUMENTS

| | | | |
|---|---|---|---|
| 5,957,560 A | 9/1999 | Do et al. | |
| 6,128,131 A | 10/2000 | Tang | |
| 6,769,773 B1 | 8/2004 | Wu | |
| 6,986,581 B2 | 1/2006 | Sun et al. | |
| 7,090,355 B2 | 8/2006 | Liu et al. | |
| 7,733,310 B2 | 6/2010 | Hajjar et al. | |
| 8,232,957 B2 | 7/2012 | Hajjar et al. | |
| 8,485,669 B2 | 7/2013 | Katou et al. | |
| 10,692,417 B2 | 6/2020 | Lee et al. | |
| 2005/0088737 A1 | 4/2005 | Piehl | |
| 2006/0227087 A1 | 10/2006 | Hajjar et al. | |
| 2008/0213625 A1* | 9/2008 | Raymo | G11B 7/246 |
| 2010/0020290 A1* | 1/2010 | Kemp | H04N 9/3129 |
| | | | 353/121 |
| 2011/0109529 A1* | 5/2011 | Hajjar | G09G 3/02 |
| | | | 345/32 |
| 2017/0184950 A1 | 6/2017 | Huang et al. | |
| 2019/0086785 A1 | 3/2019 | Pan et al. | |

* cited by examiner

*Primary Examiner* — Kyu Chae
(74) *Attorney, Agent, or Firm* — Martin Fessenmaier; Umberg Zipser LLP

(57) ABSTRACT

A visual display system is provided. The system includes a digital projector and a projection surface. The digital projector projects an image on a projection surface using at least one ultraviolet light source to excite fluorescent material associated with the surface to form the image. The at least one ultraviolet light source may generate a single wavelength of ultraviolet light capable of exciting the fluorescent material to emit a color (e.g., red, green, blue, yellow, etc.). Alternatively, the at least one ultraviolet light source may generate a plurality of wavelengths of ultraviolet light capable of exciting a plurality of fluorescent materials to emit a variety of colors to form the image.

9 Claims, 6 Drawing Sheets

PROJECTION SYSTEM AND METHODS THEREFOR

This application claims priority to U.S. Provisional patent application Ser. No. 63/293,418, filed Dec. 23, 2021, and which is incorporated by reference herein.

FIELD OF THE INVENTION

The field of the invention is direct to projecting an image on a projection surface using at least one ultraviolet light source to excite fluorescent material associated with the surface to form images.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

All publications and patent applications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Projection displays today are designed to directly produce images in red, green and blue colors of visible light and then project the visible light on a projection surface, such as a screen, to show the images on the screen. In such systems, the screen is simply a surface that receives the visible light and thus renders the images visible to a viewer. Such projection displays may use white light sources where white beams are filtered and modulated to produce images in red, green and blue colors of visible light. Alternatively, three visible light sources in red, green and blue may be used to directly produce three beams in red, green and blue colors of visible light and the three beams are modulated to produce the images. Examples of such projection displays include digital light processing (DLP) displays, liquid crystal on silicon (LCoS) displays, and grating light valve (GLV) displays. Notably, GLV displays use three grating light valves to modulate red, green and blue laser beams, respectively, and use a beam scanner to produce the images on a screen. Another example of laser-based projection displays is described in U.S. Pat. No. 5,920,361. Projection displays use optical lens systems to project the images on the screen. However, conventional projection displays suffer from limited brightness, especially when the projection displays are in the presence of daylight. Furthermore, conventional projection displays cannot project on transparent surfaces and thus are not suitable for holographic or animatronic applications. Moreover, due to the need to project the visible light to the screen, conventional projection displays exhibit poor black levels due to their inability to prevent illumination of portions of the screen that should appear black.

Some other image and video displays use a "direct" configuration where the screen itself includes visible light-producing color pixels to directly form images in the screen. Such direct displays eliminate the optical lens systems for projecting the images and therefore can be made relatively smaller than projection displays with the same screen sizes. Examples of direct display systems include plasma displays, liquid crystal displays (LCDs), light-emitting-diode (LED) displays (e.g., organic LED displays), and field-emission displays (FEDs). Each color pixel in such direct displays includes three adjacent color pixels which visible light in red, green and blue, respectively, by either directly emit colored light as in LED displays and FEDs or by filtering white light such as the LCDs. However, direct displays at sizes necessary for cinema environments or movie production are cost prohibitive for most users. Furthermore, similar to conventional projection displays, direct displays cannot project on transparent surfaces and thus are also not suitable for holographic or animatronic applications. Moreover, today's displays, with the exception of organic LED displays, require the use of a backlight to illuminate their visible light-producing color pixels and thus also exhibit poor black levels.

In view of these deficiencies, digital projectors have been developed that can create images in glass by projecting ultraviolet light generated by ultraviolet light sources to excite fluorescent materials integrated into the glass (see U.S. Pat. No. 6,986,581). The fluorescent materials emit visible light in response to absorption of ultraviolet light generated by the digital projector to form the image on the glass. The digital projectors include scanning units for selectively illuminating the desired fluorescent materials with ultraviolet light to excite the fluorescent materials according to the desired images. However, due to the independent lighting of each of colors of the fluorescent materials, the resulting images by these digital projectors lack brightness during bright scenes due to the emission constraints of each ultraviolet light source on its own. Furthermore, these digital projectors are not suitable for holographic or animatronic applications due to the limitations of using glass for its projection surface.

Thus, even though various devices and methods of for projecting an image on a projection surface are known in the art, all or almost all of them suffer from several drawbacks. Therefore, there remains a need for devices and methods for projecting an image on a projection surface.

SUMMARY OF THE INVENTION

The inventive subject matter is directed to various devices and methods for projecting an image on a projection surface using at least one ultraviolet light source to excite fluorescent material deposited on the surface to form images. The at least one ultraviolet light source may generate a single wavelength of ultraviolet light capable of exciting the fluorescent material to emit a color (e.g., red, green, blue, yellow, etc.). Alternatively, the at least one ultraviolet light source may generate a plurality of wavelengths of ultraviolet light capable of exciting a plurality of fluorescent materials to emit a variety of colors.

In one aspect of the inventive subject matter, the inventors contemplate a digital projector. The digital projector includes a control circuit configured to receive a video signal from a video source and to convert the video signal to a 4-channel signal. The 4-channel signal includes a red channel signal, a green channel signal, a blue channel signal, and a luminance signal. The digital projector further includes a first, second, third, and fourth ultraviolet light source with each electronically coupled to the control circuit.

It is contemplated that the first ultraviolet light source emits ultraviolet light in a first wavelength band, the second ultraviolet light source emits ultraviolet light in a second wavelength band, and the third ultraviolet light source emits ultraviolet light in a third wavelength band. The first, second, and third wavelength bands do not substantially overlap. The fourth ultraviolet light source emits ultraviolet light in a fourth wavelength band that overlaps with the first, second, and third wavelength bands. The inventor contemplates that the fourth ultraviolet light source may be utilized to increase luminance of the image on the projection surface based on the luminance signal.

Typically, the digital projector further includes first, second, third, and fourth scanning unit coupled to the first, second, third, and fourth ultraviolet light sources, respectively. The scanning units are further electronically coupled to the control circuit. The control circuit uses the 4-channel signal to control operation of the first, second, third, and fourth scanning units.

It is contemplated that the digital projector further includes a light assembly that includes one of the ultraviolet light sources and the corresponding scanning unit. In these and other embodiments, the ultraviolet light sources include an ultraviolet diode and the scanning units include a liquid crystal display (LCD) chip, a digital micro mirror (DMD), a galvanometer-based scanning motor, or combinations thereof. In exemplary embodiments, the scanning units include the liquid crystal display (LCD) chip. In various embodiments, the light assembly includes a filter (e.g., a bandpass filter), a lens (e.g., a collimating lens, a condenser lens, and/or a focus/zoom lens).

In another aspect of the inventive subject matter, the inventor contemplates a projection surface including a carrier substrate to which are coupled a first, second, and third fluorescent materials. The first fluorescent material emits fluorescence at a first color (e.g., red) when illuminated by ultraviolet light in a first wavelength band. The second fluorescent material emits fluorescence at a second color (e.g., green) when illuminated by ultraviolet light in a second wavelength band. The third fluorescent material emits fluorescence at a third color (e.g., blue) when illuminated by ultraviolet light in a third wavelength band. The first, second, and third colors are distinct and the first, second, and third wavelength bands do not substantially overlap. The first, second, and third fluorescent materials are arranged in a pixel pattern.

It is contemplated that the fluorescent materials are substantially transparent. In various embodiments, the fluorescent materials include a fluorescent component (e.g., a fluorophore, a fluorescent energy transfer dye, a fluorescent pigment, a fluorescent polymer, and/or a fluorescent protein) and a fluorescent carrier (e.g., epoxy, acetate and/or polyethylene).

In various embodiments, the carrier substrate includes a plastic, a glass, or a combination thereof. The projection surface may include a coating layer overlying the carrier substrate. It is also contemplated that the carrier substrate and the coating layer are substantially transparent. The coating layer may include polycarbonate, polyurethane, silicone, PET, polyethylene, or combinations thereof.

It is contemplated that the projection surface may further include a photochromatic compound disposed between the carrier substrate and the fluorescent materials that is capable of decreasing the transmittance of visible light therethrough in the presence of a stimuli. In contrast, the photochromatic compound is substantially transparent in the absence of the stimuli. The projection surface may further include one or more additives, such as an ultraviolet absorber, an adhesive, a filler, or combinations thereof.

Various objects, features, aspects and advantages of the inventive subject matter will become more apparent from the following detailed description of preferred embodiments, along with the accompanying drawing figures in which like numerals represent like components.

DETAILED DESCRIPTION

The inventors have discovered various devices and methods for projecting an image on a projection surface using at least one ultraviolet light source to excite fluorescent material deposited on the surface to form images. The at least one ultraviolet light source may generate a single wavelength of ultraviolet light capable of exciting the fluorescent material to emit a color (e.g., red, green, blue, yellow, etc.). Alternatively, the at least one ultraviolet light source may generate a plurality of wavelengths of ultraviolet light capable of exciting a plurality of fluorescent materials to emit a variety of colors. Hence, the at least one scanning laser beam itself does not directly generate the light in red, green and blue that is seen by a viewer but instead the color light-emitting materials on the screen absorb the energy of the laser beam and emit light in red, green and blue in generating the images seen by the viewer. In exemplary embodiments, the inventors contemplate using a plurality of ultraviolet light sources with each light source configured to generate unique wavelengths of ultraviolet light that do not substantially overlap with one another. These wavelengths of ultraviolet light are capable of exciting a variety of fluorescent materials coupled to the projection surface to emit a variety of colors (e.g., red, green, blue, yellow, etc.), along with an increase in luminance of the fluorescent materials.

The fluorescent materials on the projection surface may be implemented with various materials. In addition, the projection surface may be in a variety of configurations. In one exemplary embodiment, the projection surface is a rectangular screen that includes three different fluorescent materials capable of being optically excited by the ultraviolet light to emit visible light in red, green, and blue colors suitable for forming images. The fluorescent materials may be formed on the projection surface as pixel dots arranged in parallel lines (e.g., repetitive sequential red pixel dot line, green pixel dot line, and blue pixel dot line). In another exemplary embodiment, an object (e.g., a dragonfly) includes a plurality of projection surfaces with each including at least one fluorescent material for animating the object.

Figure 1:
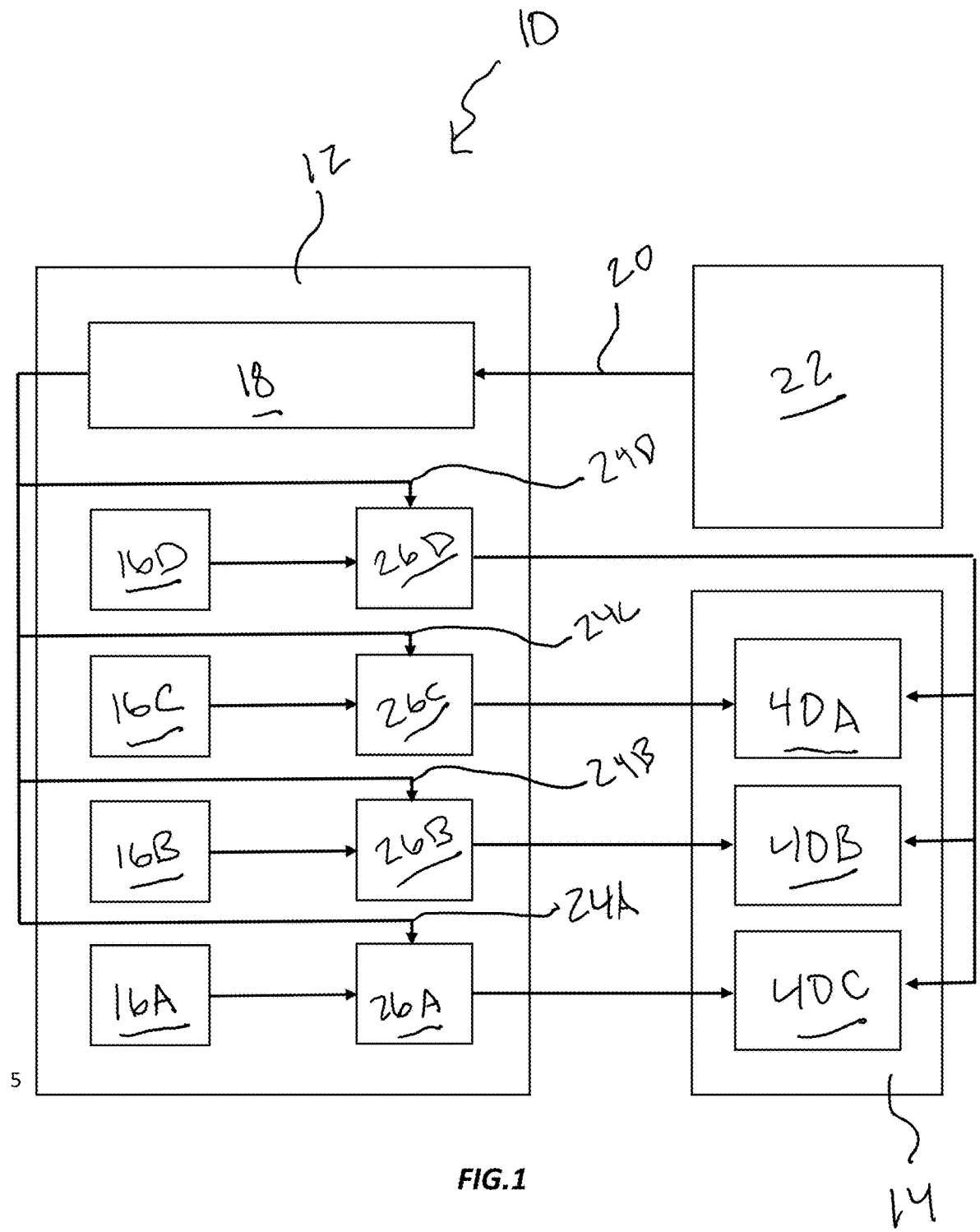
FIG. 1 is a schematic illustrating an embodiment of a visual display system including a digital projector and a projection surface.

FIG. 1 is a block diagram illustrating an embodiment of a visual display system 10 including a digital projector 12 for projecting an image on a projection surface 14. The image may be utilized for a display viewed by a viewer (e.g., a cinema display, home theater display, marketing display, holographic display, etc.), a scene (e.g., background for film production, CG design, etc.), animatronics (e.g., amusement parks, interactive guidance, etc.), or combinations thereof.

Figures 2, 3:
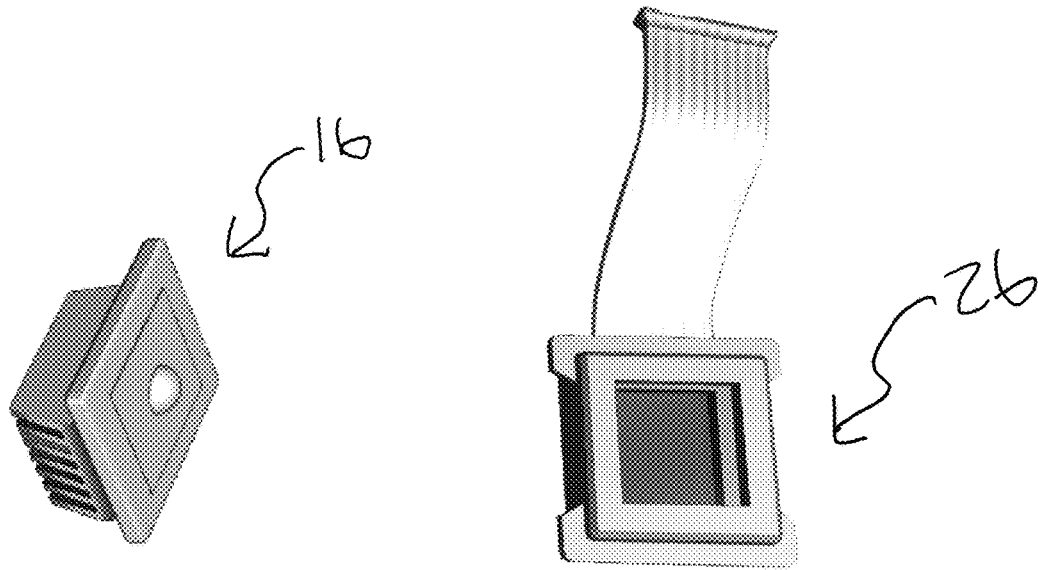
FIG. 2 is a perspective view illustrating an embodiment of the ultraviolet light source of the digital projector of FIG. 1.
FIG. 3 is a perspective view illustrating an embodiment of a scanning unit of the digital projector of FIG. 1.

The digital projector 12 includes at least one ultraviolet light source 16. The at least one ultraviolet light source 16 may be provided by any light source capable of emitting ultraviolet light (e.g., ultraviolet light having wavelengths of less than 400 nm), such as a UV diode. In various embodiments, the ultraviolet light source 16 is capable of emitting a wavelength band having a range of less than 100 nm, less than 50 nm, less than 25 nm, less than 20 nm, less than 15 nm, less than 10 nm, less than 5 nm, or less than 1 nm. An exemplary embodiment of the ultraviolet light source 16 is shown in FIG. 2.

In various embodiments, the digital projector 12 includes a first ultraviolet light source 16A, a second ultraviolet light source 16B, a third ultraviolet light source 16C, and a fourth ultraviolet light source 16D. The first ultraviolet light source 16A emits ultraviolet light in a first wavelength band, the second ultraviolet light source 16B emits ultraviolet light in a second wavelength band, and the third ultraviolet light source 16C emits ultraviolet light in a third wavelength band. The first, second, and third wavelength bands do not substantially overlap. The fourth ultraviolet light source 16D emits ultraviolet light in a fourth wavelength band that overlaps with the first, second, and third wavelength bands. It is to be appreciated that the wavelength of the ultraviolet light emitted by each of the ultraviolet light sources 16 may be adjusted to provide flexibility to the visual display system 10 and thus adapt to the particular needs of the display, scene, or animatronic applications.

The digital projector 12 further includes a control circuit 18 configured to receive a video signal 20 from a video source 22 and to convert the video signal 20 to a red channel signal 24A, a green channel signal 24B, a blue channel signal 24C, or combinations thereof. In certain embodiments, the control circuit 18 is configured to receive the video signal 20 from the video source 22 and to convert the video signal 20 to a 4-channel signal. The 4-channel signal includes the red channel signal 24A, the green channel signal 24B, the blue channel signal 24C, and a luminance signal 24D. However, it is to be appreciated that the digital projector 12 may include any number of channels formed from the control circuit 18 (e.g., one, two, three, four, five, six, seven, eight, or even more). In these and other embodiments, the ultraviolet light sources 16 are electronically coupled to the control circuit 18.

The digital projector 12 further includes at least one scanning unit 26. The scanning unit 26 may include any device capable of scanning ultraviolet light. In certain embodiments, the scanning unit 26 includes a liquid crystal display (LCD) chip, a digital micro mirror (DMD), a galvanometer-based scanning motor, or combinations thereof. An exemplary embodiment of the scanning unit 26 includes the liquid crystal display (LCD) chip and is shown in FIG. 3.

In various embodiments, the digital projector 12 includes a first scanning unit 26A, a second scanning unit 26B, a third scanning unit 26C, and a fourth scanning unit 26D. The first, second, third, and fourth scanning units 26A, 26B, 26C, 26D are coupled to the first, second, third, and fourth ultraviolet light sources 16A, 16B, 16C, 16D, respectively. The first, second, third, and fourth scanning units 26A, 26B, 26C, 26D are further electronically coupled to the control circuit 18. The control circuit 18 uses the 4-channel signal to control operation of the first, second, third, and fourth scanning units 26A, 26B, 26C, 26D. As described in greater detail below; the inventor contemplates that the fourth ultraviolet light source 16D may be utilized to increase luminance of the image on the projection surface 14 based on the luminance signal 24D.

Figure 4:
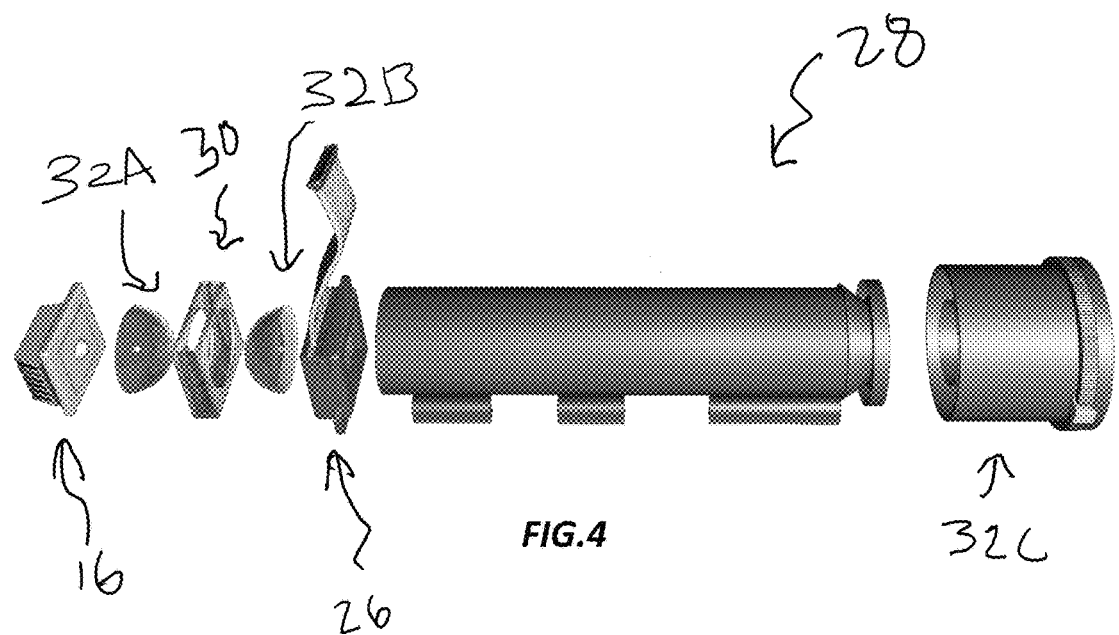
FIG. 4 is a perspective view illustrating an embodiment of a light assembly of the digital projector of FIG. 1 with the light assembly including the ultraviolet light source and the scanning unit.

FIG. 4 is a perspective view illustrating an embodiment of a light assembly 28 including the ultraviolet light source 16. The light assembly 28 may further include a filter 30. The filter 30 may in optical communication with the ultraviolet light source 16 and the scanning unit 26 such that the ultraviolet light emitted from the ultraviolet light source 16 moves through the filter 30 and then through the scanning unit 26. In certain embodiments, the filter 30 includes a bandpass filter that transmits ultraviolet light in the desired wavelength band and rejects other wavelengths of light. It is to be appreciated that the light assembly 28 may include more than one filter, such as two filters, three filters, four filters, or even more.

The light assembly 28 may further include a lens 32. In certain embodiments, the light assembly 28 includes a collimating lens 32A, a condenser lens 32B, a focus/zoom lens 32C, or combinations thereof. The collimating lens 32A is in optical communication with the ultraviolet light source 16 and the filter 30 to narrow the ultraviolet light emitted from the ultraviolet light source 16 for moving through the filter 30. The condenser lens 32B is in optical communication with the filter 30 and the scanning unit 26 to expand the ultraviolet light from the filter 30 for moving through the scanning unit 26. The focus/zoom lens 32C is in optical communication with the scanning unit 26 to adjust the ultraviolet light from the scanning unit 26 for illuminating the projection surface 14.

Figure 5:
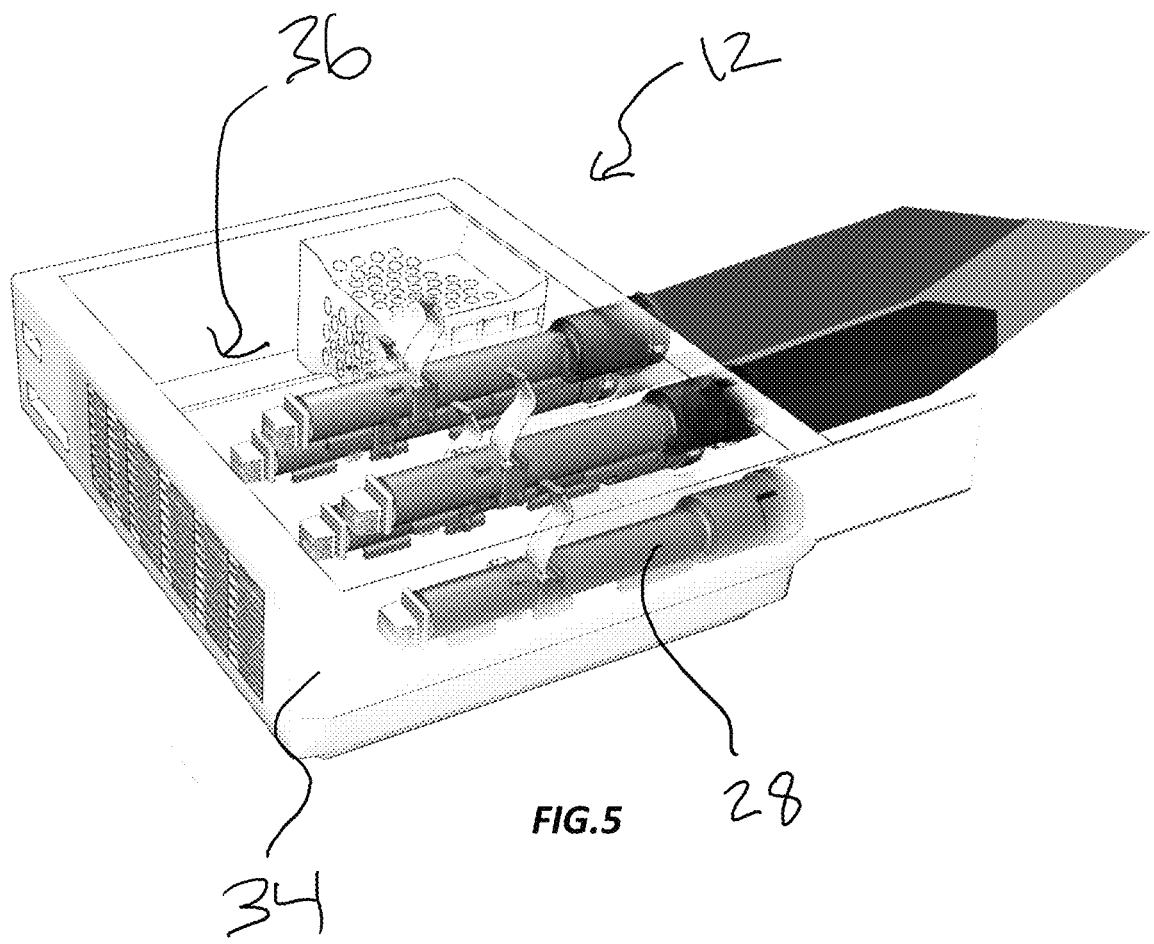
FIG. 5 is a perspective view illustrating an embodiment of the digital projector of FIG. 1 including the light assembly of FIG. 4.

FIG. 5 is a perspective view illustrating an embodiment of the digital projector 12. The digital projector 12 may include a cover 34 defining an interior space 36 The first ultraviolet light source 16A, the second ultraviolet light source 16B, the third ultraviolet light source 16C, and the fourth ultraviolet light source 16D may be disposed in the interior space 36. It is to be appreciated that the digital projector 12 may include more or less than three ultraviolet light sources 16, (e.g., one, two, three, five, six, seven or even more ultraviolet light sources 16). In exemplary embodiments, the digital projector 12 includes five ultraviolet light sources 16. Each of the ultraviolet light sources 16 are configured to have direct line of sight to the projection surface 14. In other words, the ultraviolet light generated by each of the ultraviolet light sources 16 are not combined to form a single source of ultraviolet light. However, it is to be appreciated that two or more of the ultraviolet lights generated by the ultraviolet light sources 16 may be combined.

The visual display system 10 may include a plurality of digital projectors 12, such as two, three, four, five, six, or even more. The plurality of digital projectors 12 may independently include any number of ultraviolet light sources 16. The plurality of digital projectors 12 may be configured to operate together, or independently, to provide ultraviolet light to one or more projection surfaces 14. In various embodiments, the digital projector 12 is modular such that one or more of the ultraviolet light sources 16 (or light assemblies 28) may be removed from the cover 34 yet remain in communication with the digital projector 12 (e.g., via a long communication cable). Furthermore, one or more of the ultraviolet light sources 16 (or light assemblies 28) of one digital projector 12 may be swapped with one or more of the ultraviolet light sources 16 (or light assemblies 28) of another digital projector 12 to provide flexibility to the visual display system 10 and thus adapt to the particular needs of the display, scene, or animatronic applications.

Figure 6A:
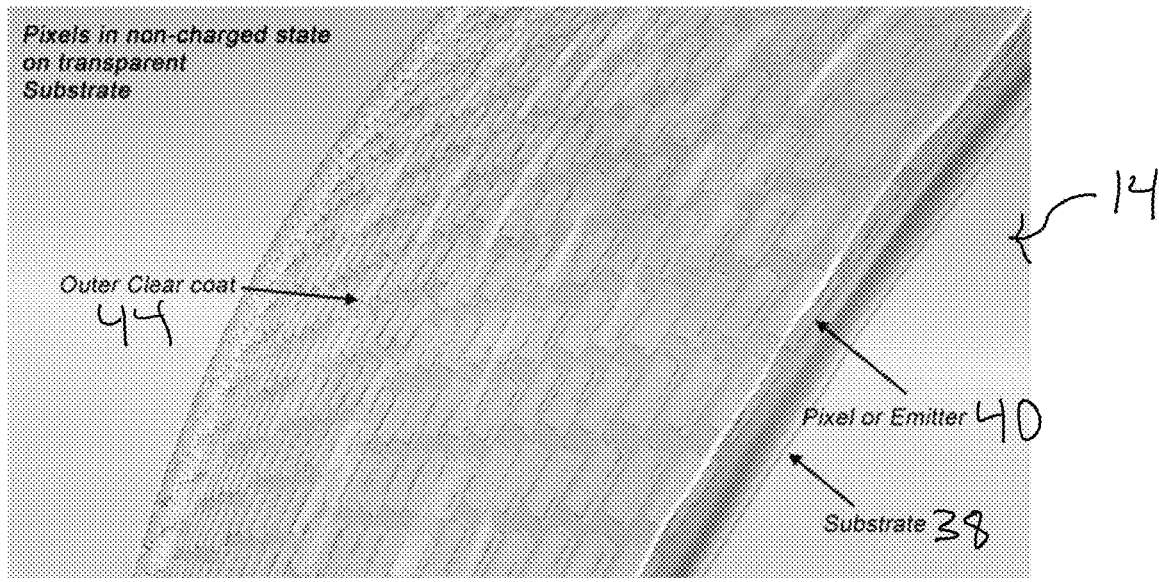
FIGS. 6A-6B are perspective views illustrating embodiments of the projection surface of FIG. 1.
Figure 6B:
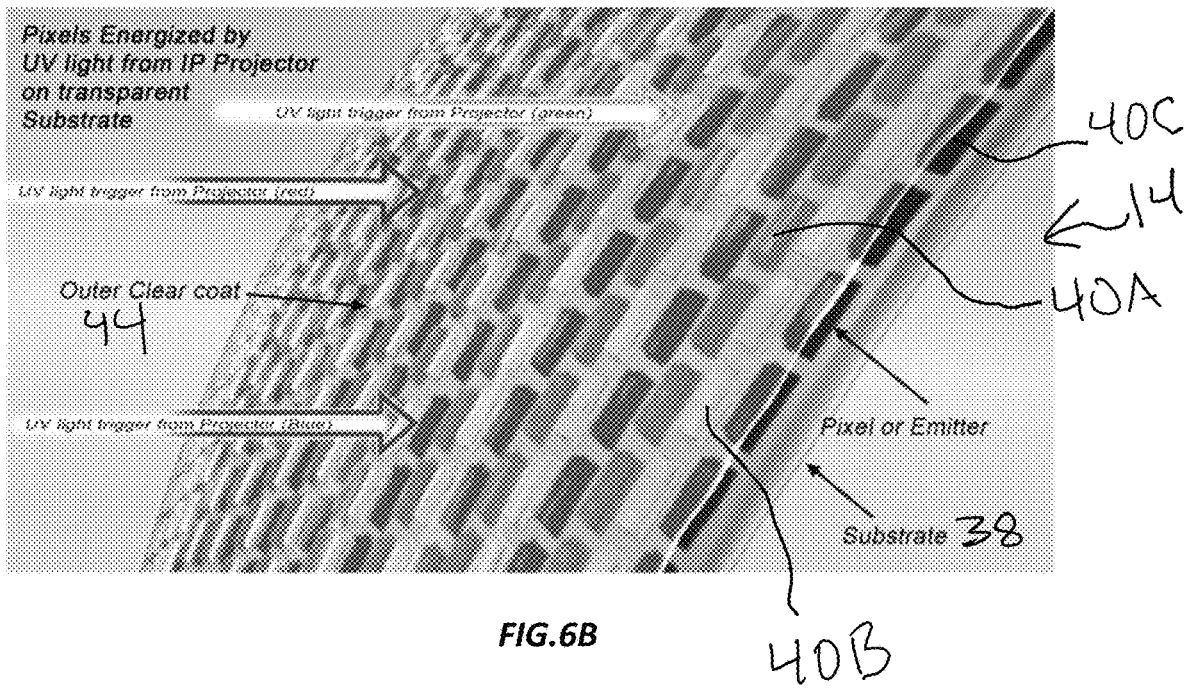
Figure 7A:
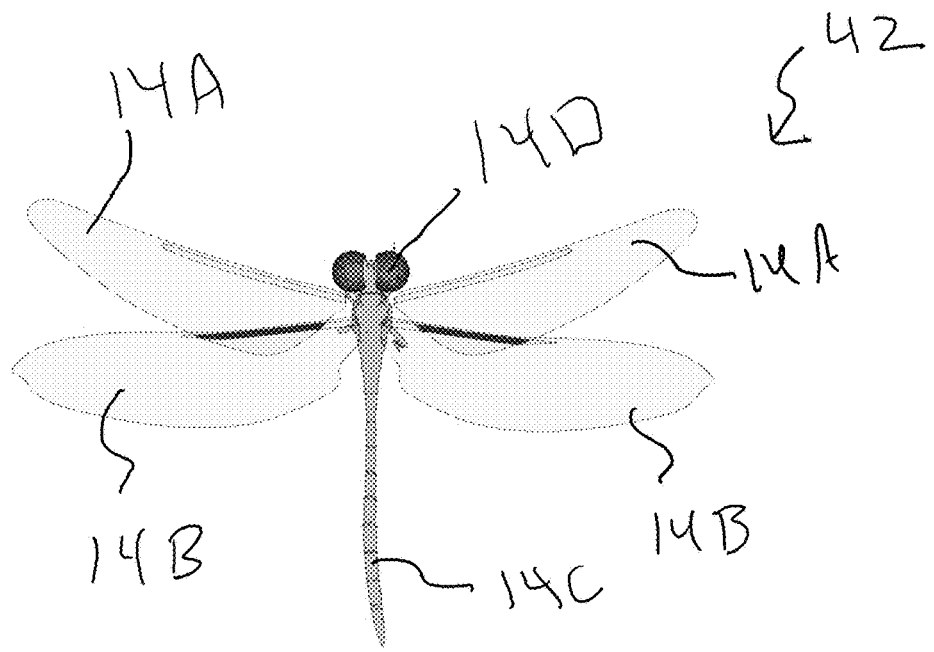
FIGS. 7A-7D are perspective views illustrating embodiments of an object including the projection surface of FIG. 1.
Figure 7B:
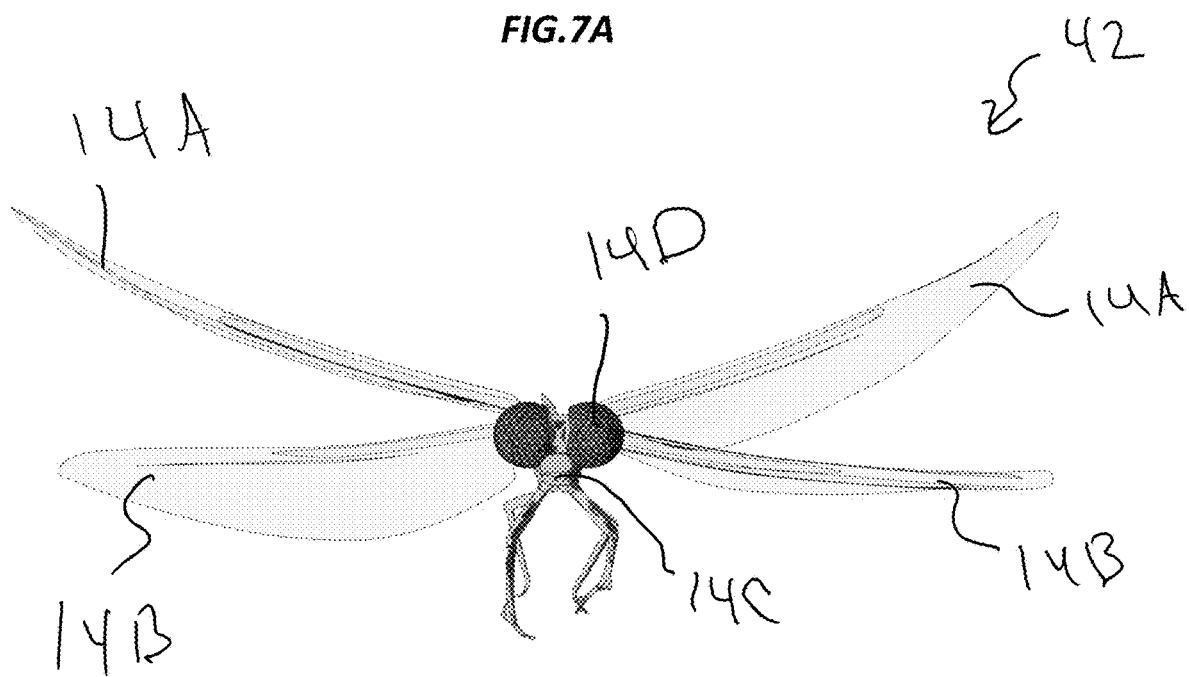
Figure 7C:
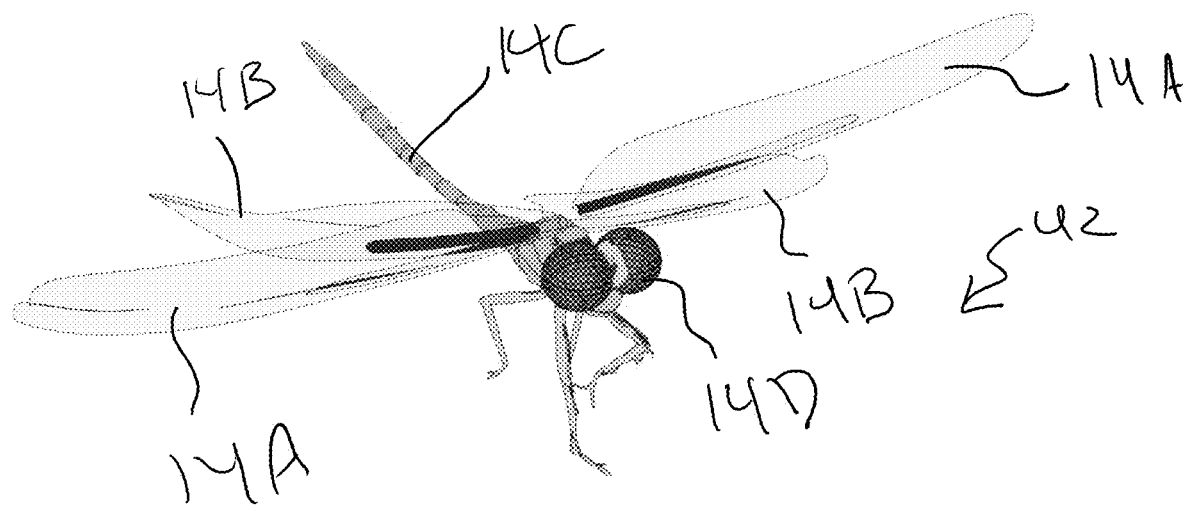
Figure 7D:
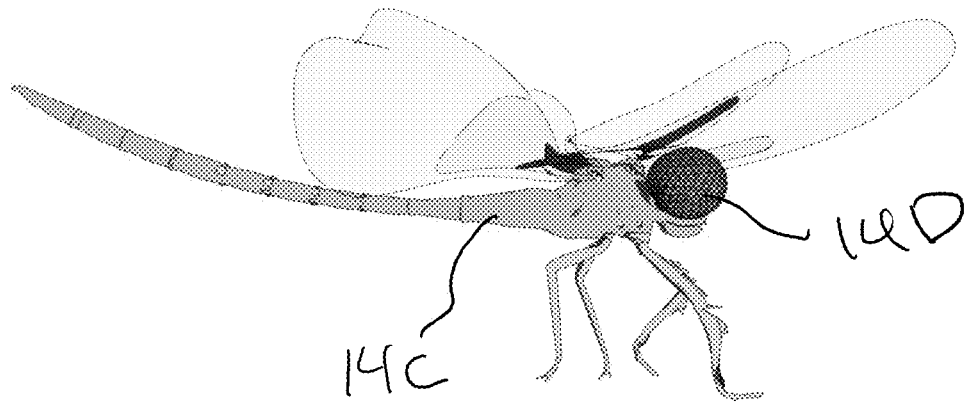

FIGS. 6A-B and 7A-D are perspective views of the projection surface 14. With particular reference to FIGS. 6A-B, the projection surface 14 includes a carrier substrate 38 and a fluorescent material 40 coupled thereto. The projection surface 14 is capable of receiving the ultraviolet light from the ultraviolet light source 16 and emitting visible light to be viewed by a viewer proximate to the projection surface 14. In particular, the ultraviolet light generated by the ultraviolet light source 16 excites the fluorescent material 40 that then emits visible light in response to the ultraviolet light. The projection surface 14 may be in any form known in the art. For example, the projection surface 14 may be configured as a rectangular screen. Alternatively, with particular reference to FIGS. 7A-D, the projection surface 14 may be configured in a shape of an object 42 to be animated, such as a dragonfly. However, it is to be appreciated that the projection surface 14 may be configured in the shape of other objects (e.g., a face of animatronic character).

The fluorescent material 40 is capable of fluorescing upon excitation by the ultraviolet light generated by the ultraviolet light source 16. In various embodiments, the fluorescent material 40 is substantially transparent in the presence of visible light, but not in the presence of ultraviolet light (see FIG. 6A). The term "substantially" as utilized herein means that the fluorescent material 40 has a transmittance to visible light in an amount of at least 50%, at least 60%, at least 70%, at least 80%, at least 90%, at least 95%, at least 96%, at least 97%, at least 98%, at least 99%, at least 99.5%, or even more in accordance with ASTM D1746-09. Any fluorescent material known in the art may be utilized so long as it is excited by ultraviolet light and emits visible light. For example, the fluorescent dye may be derived from or include rare earth minerals and/or organic materials such as pollen. For example, the projection surface 14 may include that is excited by ultraviolet light at a wavelength of less than 400 nm and emits visible light at a wavelength of between 400 nm and 700 nm (e.g., 630 nm for red-colored visible light, 532 nm for green-colored visible light, and 465 nm for blue-colored visible light). However, it is to be appreciated that other wavelengths of colored visible light may be utilized, such as those associated with the colors yellow and purple.

The fluorescent material 40 may include a fluorescent component, such as fluorophores, fluorescent energy transfer dyes, fluorescent pigments, fluorescent polymers, fluorescent proteins, or combinations thereof. The term "fluorophore" as utilized herein means fluorescent chemical compounds that can re-emit light upon light excitation. The phrase "fluorescent energy transfer dyes" as utilized herein means fluorescent dyes including a donor fluorophore and an acceptor fluorophore such that when the donor and acceptor fluorophores are positioned in proximity with each other and with the proper orientation relative to each other, the energy emission from the donor fluorophore is absorbed by the acceptor fluorophore and causes the acceptor fluorophore to fluoresce. The phrase "fluorescent pigments" as utilized herein means that the fluorophore is present in solution in a polymer matrix. Non-limiting examples of suitable fluorescent materials 40 include coumarins, pyrenes, perylenes, terrylenes, quaterrylenes, naphthalimides, cyanines, xanthenes, oxazines, anthracenes, naphthacenes, anthraquinones, thiazines, fluoresceins, rhodamines, asymmetric benzoxanthenes, xanthenes, phthalocyanines, squaraines, and combinations thereof. Other examples of suitable fluorescent materials 40 include europium, terbium, cerium, thulium, praseodymium, erbium, and combinations thereof. Additional examples of suitable fluorescent materials 40 can be found in U.S. Pat. No. 6,986,518 B2 which is incorporated herein by reference in its entirety.

With particular reference to FIG. 6B, in certain embodiments, the fluorescent material 40 may include a first fluorescent material 40A coupled to the carrier substrate 38 that emits fluorescence at a first color (e.g., red-colored visible light) when illuminated by ultraviolet light in the first wavelength band. The projection surface 14 may further include a second fluorescent material 40B that emits fluorescence at a second color (e.g., green-colored visible light) when illuminated by ultraviolet light in a second wavelength band. The projection surface 14 may further include a third fluorescent material 40C that emits fluorescence at a third color (e.g., blue-colored visible light) when illuminated by ultraviolet light in a third wavelength band. The first, second, and third colors are distinct and the first, second, and third wavelength bands do not substantially overlap. The term "substantially" as utilized herein means that the first, second, and third wavelength bands overlap in an amount of no greater 25%, no greater than 20%, no greater than 15%, no greater than 10%, no greater than 5%, no greater than 4%, no greater than 3%, no greater than 2%, no greater than 1%, no greater than 0.5%, no greater than 0.1%, or even less, based on a total distance of the wavelength band.

The fluorescent material 40 may include a fluorescent carrier. In various embodiments, the fluorescent component may be dispersed throughout the fluorescent carrier. The fluorescent component may be present in a weight ratio of the fluorescent component to fluorescent carrier of from 1:1000 to 1:1, from 1:500 to 1:1, from 1:100 to 1:1, from 1:50 to 1:1, from 1:25 to 1:1, or from 1:20 to 1:1. It is to be appreciated that depending on the type of fluorescent component utilized, the amount of the fluorescent component may be adjusted to normalize the emittance among the fluorescent materials 40 included in the projection surface 14. Non-limiting examples of suitable fluorescence carriers, include epoxy, acetate, polyethylene, or combinations thereof. The fluorescent material 40 may be applied to the carrier substrate 38 using any method known in the art for applying a material, such as a polymeric material, to a substrate. In certain embodiments, the fluorescent material 40 is applied utilizing additive manufacturing (e.g., printing).

The fluorescent material 40 may be arranged in any configuration or pattern known in the art for generating images for the display, scene, or animatronics. In certain embodiments, the first, second, and third fluorescent materials 40A, 40B, 40C are arranged to form a unit pixel in a pixel pattern. It is to be appreciated that the first, second, and third fluorescent materials 40A, 40B, 40C may be referred to as sub-pixels, e.g., a red (R) sub-pixel, a green (G) sub-pixel, and a blue (B) sub-pixel. It is contemplated, however, that any suitable color and number of sub-pixels may be utilized herein. For example, in various embodiments, a single fluorescent material 40 arranged in a pixel pattern may be utilized in various applications (e.g., special effects, particle visualizations, atmosphere visualizations for a scene, and the like). In other embodiments, a plurality of fluorescent materials 40 arranged in separate pixel patterns may be utilized with each of the fluorescent materials 40 disposed on a different carrier substrate 40) to generate animations similar to "cel animations" for various applications (e.g., special effects, particle visualizations, atmosphere visualizations for a scene, and the like).

With particular reference to FIG. 6B, in exemplary embodiments, the pixel pattern includes alternating rows of the first, second, and third fluorescent materials 40A, 40B, 40C. Each of the first, second, and third fluorescent materials 40A, 40B, 40C (i.e. each sub-pixel) may have a rectangular shape. In these and other embodiments, placement of the fluorescent materials 40 of each row is partially offset from the fluorescent materials 40 of the adjacent row: Non-limiting examples of other pixel patterns include quantum dot patterns, Bayer CFA patterns, and the like.

In other embodiments, the one or more fluorescent materials 40 may be coated or painted on the carrier substrate 38. The fluorescent materials 40 may be coated or painted in any configuration or orientation known in the art. In some embodiments of the projection surface 14 (e.g., dragonfly body and wings), the carrier substrate 38 may have a first area and a second area with the first area coated with the first fluorescent material 40A and the second area coated with the second fluorescent material 40B. It is to be appreciated that more than two fluorescent materials 40 may be utilized for more than two areas of the carrier substrate 38. It is also to be appreciated that the projection surface 14 may include more than one carrier substrate 38. Furthermore, it is to be appreciate that a plurality of projection surfaces 14 may be coated with different fluorescent materials 40 and then the plurality of projection surfaces 14 may be arranged relative to one another to form an assembly of the projection surfaces 14. For example, in the embodiment of a dragonfly, the body may be a projection surface, a first set of wings may be a projection surface, and the second set of wings may be a projection surface.

The carrier substrate 38 may be any material known in the art capable of supporting the fluorescent material 40. In various embodiments, the carrier substrate 38 is substantially transparent. The term "substantially" as utilized herein means that the carrier substrate 38 has a transmittance to visible light in an amount of at least 50%, at least 60%, at least 70%, at least 80%, at least 90%, at least 95%, at least 96%, at least 97%, at least 98%, at least 99%, at least 99.5%, or even more in accordance with ASTM D1746-09. Non-limiting examples of suitable materials for forming the carrier substrate include plastics (e.g. PVC, PET, polyacrylate, polystyrene, and polycarbonate), glass (e.g., silicates, borosilicate, lead crystal, alumina, silica, fused silica, quartz, glass ceramics, and metal fluorides), or combinations thereof. However, it is to be appreciated that the carrier substrate 38 may be opaque, such as for animating opaque objects or for front projection screens. The carrier substrate 38 may have a thickness in any amount suitable to achieve the desired properties of the projection surface 14.

The projection surface 14 may further include a coating layer 44 overlying the carrier substrate 38 and the fluorescent material 40. In certain embodiments, the coating layer 44 may at least partially encapsulate the fluorescent material 40. In various embodiments, the coating layer 44 is substantially transparent. The term "substantially" as utilized herein means that the coating layer 44 has a transmittance to visible light in an amount of at least 50%, at least 60%, at least 70%, at least 80%, at least 90%, at least 95%, at least 96%, at least 97%, at least 98%, at least 99%, at least 99.5%, or even more in accordance with ASTM D1746-09. Non-limiting examples of suitable coating layers include, or are formed from, polycarbonate, polyurethane, silicone, PET, polyethylene, or combinations thereof. The coating layer 44 may have a thickness in any amount suitable to achieve the desired properties of the projection surface 14.

The projection surface 14 may further include a photochromatic compound capable of decreasing the transmittance of visible light therethrough in the presence of a stimuli (e.g., infrared light, heat, electrical current, and the like). The photochromatic compound may be disposed between the carrier substrate 38 and the first, second, and third fluorescent materials 40A, 40B, 40C. In various embodiments, the photochromatic compound is substantially transparent in the absence of the stimuli. The term "substantially" as utilized herein means that the photochromatic compound has a transmittance to visible light in the absence of stimuli in an amount of at least 50%, at least 60%, at least 70%, at least 80%, at least 90%, at least 95%, at least 96%, at least 97%, at least 98%, at least 99%, at least 99.5%, or even more in accordance with ASTM D1746-09. In the presence of stimuli, the photochromatic compound may have a transmittance in an amount of no greater than 50%, no greater than 40%, no greater than 30%, no greater than 20%, no greater than 10%, no greater than 5%, no greater than 4%, no greater than 3%, no greater than 2%, no greater than 1%, no greater than 0.5%, or even less in accordance with ASTM D1746-09.

It is contemplated herein that the photochromatic compound may be utilized to improve the "black level" of the image or animation generated by the projection surface 14. The photochromatic compound may also be utilized to form shadows for a hologram generated by the projection surface 14. The photochromatic compound may be disposed opposite the position of the desired viewing orientation of the projection surface 14 by the viewer relative to the fluorescent material 40. In other words, the fluorescent material 40 may be disposed between the viewer and the photochromatic compound. In various embodiments, the photochromatic compound may react in the presence or absence of the stimuli at a rate slower than the rate of emission of visible light from the fluorescent material 40 in the presence of the ultraviolet light (i.e. refresh rate). To this end, the video signal 20 may include instructions for normalizing the refresh rates of the fluorescent material 40 and the photochromatic compound.

The projection surface 14 may further include one or more additives. Non-limiting examples of suitable additives include ultraviolet absorbers, adhesives, fillers, or combinations thereof. The ultraviolet absorber may be a film coupled to a component of the projection surface 14, a compound combined with a component of the projection surface 14, or a combination thereof. The ultraviolet absorber may be included with or in the coating layer 44 for minimizing exposure of the environment to ultraviolet light when the ultraviolet light source 16 provides ultraviolet light to the fluorescent material 40 through the carrier substrate 38 (e.g., rear projection screens). On the other hand, the ultraviolet absorber may be included with or in the carrier substrate 38 for minimizing exposure of the environment to ultraviolet light when the ultraviolet light source 16 provides ultraviolet light to the fluorescent material 40 through the coating layer 44 (e.g., front projection screens). The adhesive may be utilized to adhere components of the projection surface 14 to one another. The filler may be utilized to modulate one or more properties of the projection surface 14 (e.g., transmittance, color, texture, and the like). The additives may be utilized in any amount suitable to achieve the desired properties of the projection surface 14.

The visual display system 10 may further include a computing device capable of controlling the video source 22, the control circuit 18, or a combination thereof. In various embodiments, the computing device includes hardware and software (e.g., Adobe creative suite, Resulume, etc.) capable of controlling the components of the system 10 (e.g., a high-end workstation PC).

With reference to FIGS. 1, 4, and 5, as described above, the visual display system 10 is adaptable to the particular needs of the display, scene, or animatronics. During operation, the video source 22 generates the video signal 20 that is then received by the control circuit 18. Next, the control circuit 18 converts the video signal 16 to the red channel signal 24A, the green channel signal 24B, the blue channel signal 24C, or combinations thereof. In some exemplary embodiments, the control circuit 18 converts the video signal 20 to the 4-channel signal including the red channel signal 24A, the green channel signal 24B, the blue channel signal 24C, and the luminance signal 24D. In response to the 4-channel signal, the first, second, third and fourth ultraviolet light sources 16A, 16B, 16C, 16D emit ultraviolet light in the first, second, third, and fourth wavelength bands, respectively. The ultraviolet light emitted from the first, second, third and fourth ultraviolet light sources 16A, 16B, 16C, 16D are directed to the first, second, third, and fourth scanning units 26A, 26B, 26C, 26D through the lenses 32 and filters 30.

With reference to FIGS. 6A-B, the first, second, and third scanning units 26A, 26B, 26C direct the ultraviolet light to the first, second, and third fluorescent materials 40A. 40B, 40C of the projection surface 14 from the first, second, and third ultraviolet light sources 16A, 16B, 16C, respectively. The fourth scanning unit 26D directs the ultraviolet light to all of the fluorescent materials 40 illuminated by the first, second, and third ultraviolet light sources 16A, 16B, 16C. The fluorescent material 40 emits visible light in response to the ultraviolet light to form the image. To this end, the inventor contemplates that the fourth ultraviolet light source 16D may be utilized to increase luminance of the image on the projection surface 14 based on the luminance signal 24D by increasing the emission of visible light of all the fluorescent material 40 illuminated by the first, second, and third ultraviolet light sources 16A, 16B, 16C. In other embodiments when an increase in luminance is unnecessary, a separate image may be generated independent of the first, second, and third ultraviolet light sources 16A, 16B, 16C.

With reference back to FIGS. 4 and 5, in other exemplary embodiments, the control circuit 18 converts the video signal 20 to a first channel signal, a second channel signal, a third channel signal, a fourth channel signal, a fifth channel signal, and a sixth channel signal. In response to the channel signals, the first, second, third and fourth ultraviolet light sources 16A, 16B, 16C 16D emit ultraviolet light in the first, second, third, and fourth wavelength bands, respectively. In addition, this system 10 includes a fifth and sixth ultraviolet light sources that emit ultraviolet light in a fifth and a sixth wavelength bands, respectively. The ultraviolet light emitted from the first, second, third and fourth ultraviolet light sources 16A, 16B, 16C 16D are directed to the first, second, third, and fourth scanning units 26A, 26B, 26C, 26D through the filters 30 and the lenses 32 of the same, respectively. The ultraviolet light emitted from the fifth and sixth ultraviolet light sources (not shown) are directed to the fifth and sixth scanning units (not shown) through the filters 30 and the lenses 32.

With reference to FIGS. 7A-D, the first, second, third, and fourth scanning units 26A, 26B, 26C, 26D, along with the fifth and sixth scanning units, direct the ultraviolet light to the particular fluorescent material 40 of the projection surface 14 of the object 42 associated with each of the first, second, third, and fourth ultraviolet light sources 16A, 16B, 16C, 16D, along with the fifth and sixth scanning units. In particular, the object 42 may be a dragonfly including two sets of wings (a first projection surface 14A and a second projection surface 14B), a body portion (a third projection surface 14C), and eyes (a fourth projection surface 14D) with a recoil tab disposed between the sets of wings for providing a flutter to the wings in the presence of air movement. The first projection surface 14A includes a yellow fluorescent material and a minor portion of a blue fluorescent material, the second projection surface 14B includes a white fluorescent material and a minor portion of a blue fluorescent material, the third projection surface 14C includes a green fluorescent material and a purple fluorescent material, and the fourth projection surface 14D includes a red fluorescent material.

Prior to illumination of the object 42, the object 42 is substantially transparent. During illumination by the ultraviolet lights, the yellow, white, green, blue, purple, and red fluorescent materials emit visible light in response to form the image. It is contemplated herein that the ultraviolet light sources can be utilized to animate the dragonfly to exhibit a stylized blur, a noise map that strobes the ultraviolet light associated with the first projection surface 14A and the second projection surface 14B (the two sets of wings), and feedback to the viewer based on proximity of the viewer to the object 42. In particular, the ultraviolet light sources 40 illuminate the object 42, and the object 42 emits the ultraviolet light to animate the object 42 when the viewer approaches the object 42. As the viewer moves away from the object 42, the ultraviolet light sources 40 reduce illumination of the object 42.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. The recitation of ranges of values herein is merely intended to serve as a shorthand method of referring individually to each separate value falling within the range. Unless otherwise indicated herein, each individual value is incorporated into the specification as if it were individually recited herein.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise. As also used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

What is claimed is:

1. A digital projector, comprising:
    a control circuit configured to receive a video signal from a video source and to convert the video signal to a 4-channel signal comprising a red channel signal, a green channel signal, a blue channel signal, and a luminance signal;
    a first, second, third, and fourth ultraviolet light source, each electronically coupled to the control circuit;
    wherein the first ultraviolet light source emits ultraviolet light in a first wavelength band, the second ultraviolet light source emits ultraviolet light in a second wavelength band, and the third ultraviolet light source emits ultraviolet light in a third wavelength band;
    wherein the fourth ultraviolet light source emits ultraviolet light in a fourth wavelength band that overlaps with the first, second, and third wavelength bands, and wherein the first, second, and third wavelength bands do not substantially overlap; and
    a first, second, third, and fourth scanning unit coupled to the first, second, third, and fourth ultraviolet light sources, respectively, and further electronically coupled to the control circuit, wherein the control circuit uses the 4-channel signal to control operation of the first, second, third, and fourth scanning units.

2. The digital projector of claim 1, wherein the first, second, third, and fourth ultraviolet light sources comprise an ultraviolet diode.

3. The digital projector of claim 1, wherein the first, second, third, and fourth scanning units comprise a liquid crystal display (LCD) chip, a digital micro mirror (DMD), a galvanometer-based scanning motor, or combinations thereof.

4. The digital projector of claim 3, wherein the first, second, third, and fourth scanning units comprise the liquid crystal display (LCD) chip.

5. The digital projector of claim 1 further comprising a light assembly, wherein the light assembly comprises the first ultraviolet light source and the first scanning unit.

6. The digital projector of claim 1, wherein each of the first, second, third, and fourth ultraviolet light sources are configured to have direct line of sight to a projection surface.

7. A visual display system comprising:
    a digital projector, comprising:
        a control circuit configured to receive a video signal from a video source and to convert the video signal to a first channel signal and a second channel signal;
        a first ultraviolet light source electronically coupled to the control circuit, wherein the first ultraviolet light source emits ultraviolet light in a first wavelength band;
        a second ultraviolet light source electronically coupled to the control circuit, wherein the second ultraviolet light source emits ultraviolet light in a second wavelength band; and
        a first and second scanning units coupled to the first and second ultraviolet light sources, respectively, and further electronically coupled to the control circuit, wherein the control circuit uses the first and second channel signals to control operation of the first and second scanning units; and
    an object, comprising:
        a first projection substrate, comprising;
            a carrier substrate to which is coupled a first fluorescent material that emits fluorescence at a first color when illuminated by ultraviolet light in a first wavelength band; and
        a second projection substrate, comprising;
            a carrier substrate to which is coupled a second fluorescent material that emits fluorescence at a second color when illuminated by ultraviolet light in a second wavelength band;
        wherein the first and second colors are distinct and wherein the first and second wavelength bands do not substantially overlap.

8. The visual display system of claim 7, wherein at least one of the first and second projection substrates is movable relative to the other.

9. The visual display system of claim 8, wherein the first and second projection substrates are pivotable relative to the other.

* * * * *